United States Patent
Iwao

(10) Patent No.: US 8,019,771 B2
(45) Date of Patent: Sep. 13, 2011

(54) METHOD FOR DYNAMICALLY FINDING RELATIONS BETWEEN DATABASE TABLES

(75) Inventor: Inagaki Iwao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 11/565,017

(22) Filed: Nov. 30, 2006

(65) Prior Publication Data

US 2008/0133491 A1  Jun. 5, 2008

(51) Int. Cl.
*G06F 7/00* (2006.01)
*G06F 17/30* (2006.01)
(52) U.S. Cl. ......................... 707/759; 707/770
(58) Field of Classification Search .................. 707/4
See application file for complete search history.

(56) References Cited

U.S. PATENT DOCUMENTS

| | | | |
|---|---|---|---|
| 5,734,887 A * | 3/1998 | Kingberg et al. | 707/4 |
| 6,289,334 B1 * | 9/2001 | Reiner et al. | 1/1 |
| 7,171,423 B2 * | 1/2007 | Nishikawa et al. | 707/102 |
| 2005/0050040 A1 * | 3/2005 | Theobald et al. | 707/4 |
| 2006/0026154 A1 * | 2/2006 | Altinel et al. | 707/5 |
| 2007/0038618 A1 * | 2/2007 | Kosciusko et al. | 707/4 |
| 2007/0203893 A1 * | 8/2007 | Krinsky et al. | 707/3 |

FOREIGN PATENT DOCUMENTS

| | | |
|---|---|---|
| JP | H09-034759 | 2/1997 |
| JP | H10-021125 | 1/1998 |
| JP | H11-053401 | 2/1999 |

OTHER PUBLICATIONS

Machine Translation of Hiroshi et al., JP H09-034759, 1997.*
Machine Translation of Hiroshi et al., JP H09-034759 Figures, 1997.*

* cited by examiner

*Primary Examiner* — Cam Y T Truong
(74) *Attorney, Agent, or Firm* — Lieberman & Brandsdorfer, LLC

(57) ABSTRACT

A method and system are provided for dynamically relating tables in a federated database based upon a data manipulation language in a query transaction. After the start of a transaction has been detected, a data manipulation language from the transaction is extracted and evaluated to determine the table(s) and column(s) referenced by the transaction language. The data relation output unit determines the relationship(s) between the extracted table(s) and column(s) in real-time and conveys this information through a visual display.

18 Claims, 4 Drawing Sheets

METHOD FOR DYNAMICALLY FINDING RELATIONS BETWEEN DATABASE TABLES

BACKGROUND OF THE INVENTION

1. Technical Field

This invention relates to processing data in a federated database. More specifically, the invention relates to dynamically gathering data in a query transaction in the federated database and determining a relationship among data gathered from two or more databases that are members of the federated database in a single transaction.

2. Description of the Prior Art

A database is a collection of information organized to enable a computer program to quickly select desired data. Traditional databases are organized by fields, records, and files. A field is a single piece of information. A record is one complete set of fields. A file is a collection of records. To access information from a database, a collection of programs are used to enable entering, organizing, and selecting data in a database. Relational database systems store large amounts of data, including business data that can be analyzed to support business decisions. Data records within a relational database management system in a computing system are maintained in tables, which are a collection of rows having the same columns.

A virtual database system, also known as a federated database, is a type of metadatabase management system which transparently integrates multiple autonomous database systems into a single database. Constituent databases in the federated database are interconnected via a computer network and may be geographically decentralized. Since the constituent database systems remain autonomous, a federated database system is an alternative to the task of merging together several disparate databases. Data federation techniques are available to allow a user to access heterogeneous distributed data elements in a manner so that they are virtually stored in a single database without having to copy or move the data elements. Accordingly, a federated database is a logical composite of constituent databases.

There are limitations associated with the use of federated databases. For example, the relationship between elements within the constituent databases is critical when managing a federated database. However, it is often difficult to determine the relationship between elements within the constituent databases and to retrieve significant information about the elements from among a large number of data elements distributed therein since such information is generally available only to the application developer for that database. Since a federated database integrates multiple autonomous database systems virtually, the application developer for the federated database is not likely to be the same person or persons or have direct access to the same information otherwise available to the application developer for the native databases. Additionally, since the relationship information is generally not documented, it is likely that the information will be lost over time.

One solution is to maintain the related data elements in document form through use of an entity relationship model, or other tools at the time of application development. In computer science, an entity relationship diagram is a graphical notation for representing data models. The first stage of information system design uses these models to describe information needs or the type of information that is to be stored in a database during the requirement analysis. The data modeling technique can be used to describe an overview and classification of used terms and their relationship for a certain area of interest. However, it is not uncommon for the content of the documentation and the actual application structure to diverge from each other over time.

Other solutions for obtaining the relationships between data elements in a federated database include analyzing an object model and an application program, and using information statically defined in a database. However, as noted, these solutions are based on static information, and databases change in a dynamic manner.

Therefore, there is a need for a solution that documents the relations between data elements from different databases that virtually form a federated database in a dynamic manner. Such a solution should facilitate efficient information integration and effective utilization and reuse of information.

SUMMARY OF THE INVENTION

This invention comprises a method and system for managing heterogeneous distributed data elements in a federated database as if they were virtually stored in a single database. The management of the data elements negates the requirement of having to copy or move data elements across database platforms.

In one aspect of the invention, a method is provided for relating tables in a database. Data manipulation language is gathered for each input statement in a query transaction and the gathered statement is analyzed. The process of analyzing the language includes establishing a relationship between data elements associated with the gathered statement(s). Characteristics of relationships of the data elements are clarified based on both the structure of the data manipulation language and the content of the query transaction. Thereafter, the characteristics are classified, and conveyed in a display format.

In another aspect of the invention, a computer system is provided with a server in communication with at least one database. The server includes a status management unit, a data processing unit, and a data relation output unit. The status management unit detects start of a transaction. The data processing unit extracts data manipulation language in a query statement of the transaction and analyzes the language. The data manipulation language includes table name and column name data. The data relation output unit establishes a relationship among the extracted table and column name data. The data relation output unit clarifies characteristics of the established relationship, classifies the characteristics, and conveys the classified characteristics in a visual display.

In yet another aspect of the invention, an article is provided with a computer readable medium. Instructions are provided in the medium to gather data manipulation language for each input statement in a query transaction, and instructions are provided in the medium to analyze the gathered data manipulation language. The analysis instructions include instructions to establish a relationship between data elements associated with the gathered statement, instructions to clarify the characteristics of the relationships, instructions to classify the characteristics, and instructions to convey the classified characteristics in a visual display format. The instructions to clarify the characteristics of relationships of the data elements are based on the structure of the data manipulation language and the content of the query transaction.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

It has become common in the art for distributed autonomous databases to be virtually interconnected to form a federated database. Queries are conducted in the federated database as they are in a non-federated database. Data is dynamically gathered during the query and the relationship among tables queried during the search is determined. The gathered data is displayed in a manner that conveys the relationship among the data to facilitate relationships among the gathered data elements, such as table and column names for each input statement in the query

Technical Details

Data manipulation language is a family of computer languages used by computer programs or database users to retrieve, insert, delete, and update data in a database. SQL is a standardized query language data manipulation language ("DML") for creating, modifying, and requesting information from a relational database management system. SQL is a declarative language in that it specifies what data is desired, not how to obtain it. The query optimizer is the component of a relational database management system that determines the most efficient way to obtain the data needed to satisfy an SQL query. The output of the optimizer is called an execution plan. Virtually all database systems provide a capability to capture information about an execution plan for a query submitted from either static or dynamic database application environments.

Figure 1:
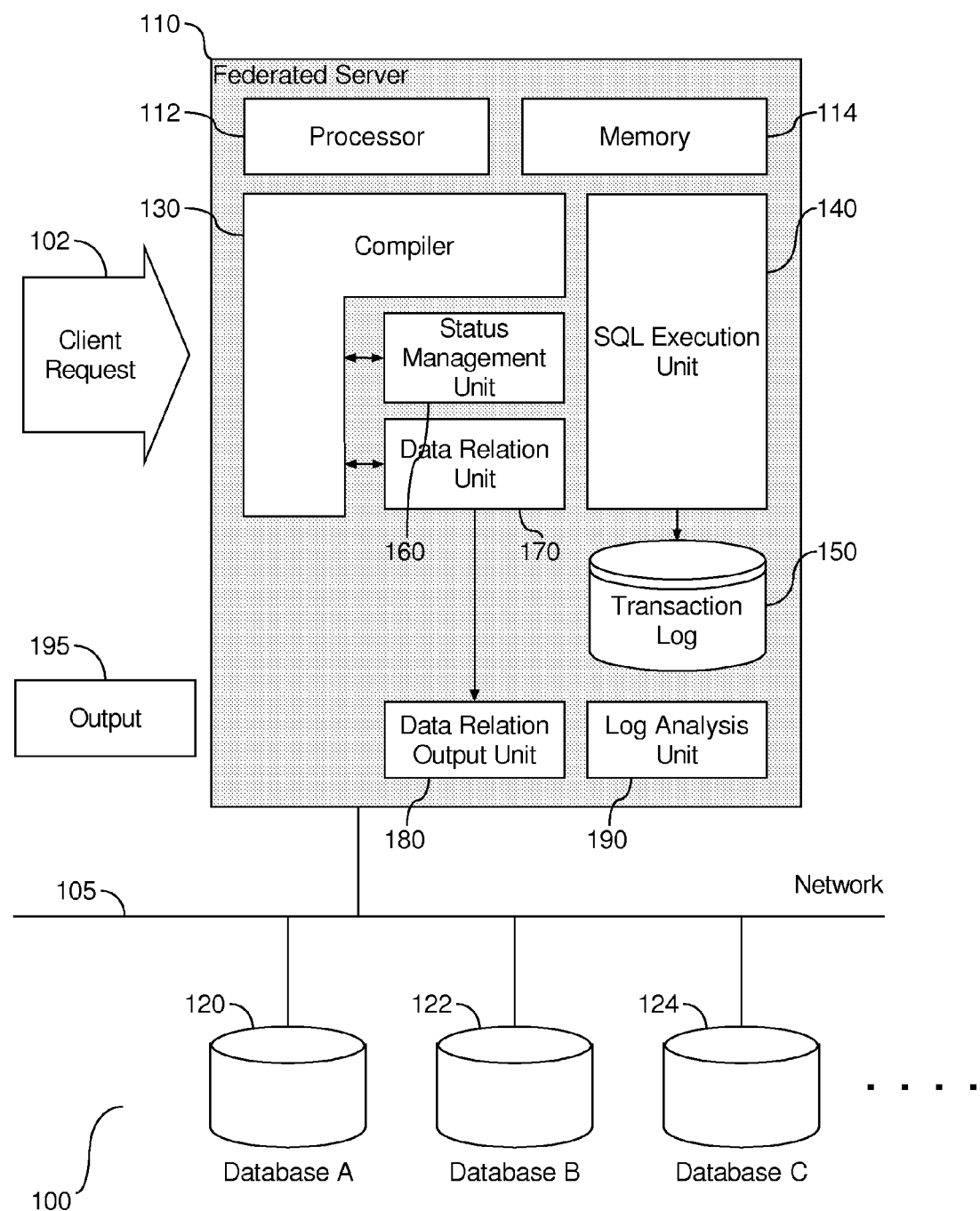
FIG. 1 is a block diagram of a computer system with a server in communication with a federated database.

FIG. 1 is a block diagram of a computer system (100) in communication with a federated database. As noted above, a federated database system includes a plurality of databases interconnected via a computer network. The constituent databases are autonomous and may be geographically decentralized. As such, a federated database is a logical composite of constituent databases. Computer system (100) shows a server (110) in communication with several constituent databases (120), (122), and (124) across a network (105). The illustration only shows three constituent databases. However, in one embodiment, the system may include more constituent databases or fewer constituent databases. The illustration herein is merely an example. The server (110), also known as a federation server, includes a processor (112), memory (114), and computer readable medium with instructions therein to support receipt of requests from clients (102) in communication with the server (110). The server includes an SQL compiler (130) to compile SQL queries, an SQL execution unit (140) to execute SQL queries and to communicate with the databases summoned in the query, and a transaction log (150) to maintain a log of all transactions executed by the execution unit (140). The SQL compiler (130), SQL execution unit (140), and transaction log (150) in communication with the SQL execution unit (140) are known in the art. In addition, the federation server includes a status management unit (160), a data relation unit (170), and a data relation output unit (180). The status management unit (160) is in communication with the compiler (130). The status management unit (160) detects the start of a transaction by the SQL compiler (130). The data relation unit (170) is in communication with both the compiler (130) and the data relation output unit (180). The data relation unit (170) records one or more tables and columns identified by the SQL compiler (130) in response to a query and communicate this extracted data to the data relation output unit (180). Similarly, the transaction log (150) receives log data from the SQL execution unit (140) and communicates the received data to a log analysis unit (190). Data output (195) from execution of the SQL query remains as in the prior art for presentation to a user on a visual display (not shown). However, the output may be configured to convey the relationship among the tables and columns for the extracted data in real-time.

Figure 2A:
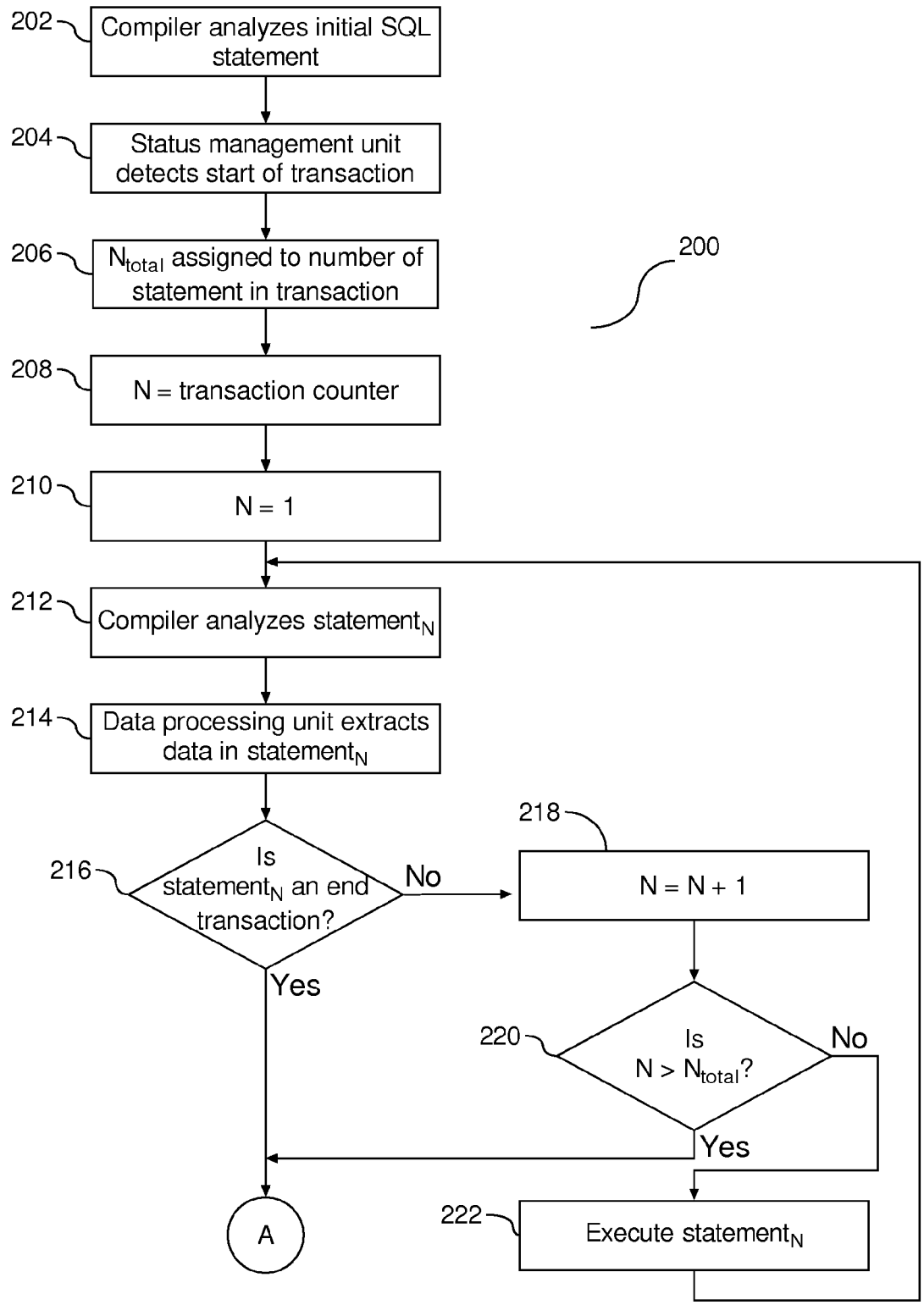
FIGS. 2A and 2B are flow charts illustrating dynamic gathering of data in a federated database, according to the preferred embodiment of this invention, and are suggested for printing on the first page of the issued patent.
Figure 2B:
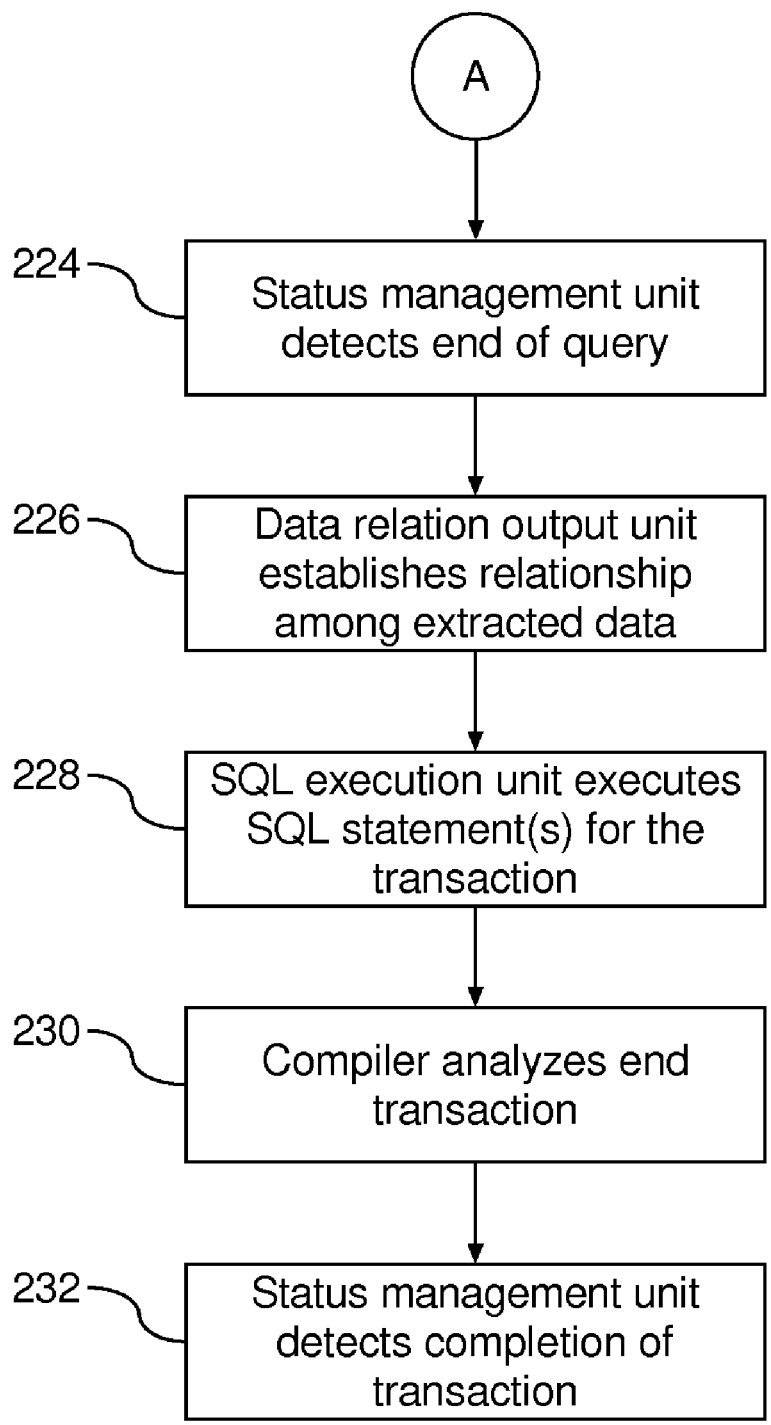

FIGS. 2A and 2B are flow charts (200) illustrating a process for dynamically finding the relationship between data elements during execution of an application operating a database. Initially a compiler analyzes an initial SQL statement (202). A compiler is a computer program or set of programs that translates text written in a source code into object code. The compiler evaluates the entire piece of source code and collects and reorganizes the instructions. Following the compiler analysis at step (202), a status management unit in communication with the compiler detects the start of a transaction (204). In one embodiment, the start of a transaction is detected with a BEGIN TRANSACTION command. This command marks the start of a database transaction. The variable $N_{total}$ is assigned to identify the number of statements in a query transaction (206), and the variable N is assigned to count the number of transactions in the query (208). The variable N is initialized and set to one (210). Following initialization of the counter, the compiler analyzes the first statement, statement$_N$, in the query as the query is being executed (212), and the data processing unit in the federated server extracts the table names and column names identified in statement$_N$ of the query (214). Following step (214), a determination is made as to whether the transaction in statement$_N$ in the query is the end of the transaction (216). In one embodiment, a COMMIT transaction command marks the end of a successful implicit or user-defined transaction and causes all data changes in a transaction to be made permanent. If the response to the determination is negative, the variable N is incremented (218). Thereafter, a determination is made as to whether the variable N is greater than the total number of statements in the query, $N_{total}$ (220). A negative response to the determination at step (220), results in execution of the next statement in the query (222) followed by a return to step (212) so that the data processing unit can extract table and column name data. However, a positive response to the determinations at steps (216) or (220) is an indication that the compiler has analyzed all of the statements in the transaction. Accordingly, the first part of the process for dynamically analyzing a SQL query is to individually extract table name and column name data from each statement in the query prior to execution of the query.

Gathering of table and column data concludes when the status management unit detects a command in a query statement that marks the end of the query (224). In one embodiment, a COMMIT transaction command is used to indicate the conclusion of the data gathering process. The data relation output unit establishes a relationship among the tables and columns for the data extracted at step (214) for each transaction (226). In one embodiment the data relation output unit analyzes the data manipulation language (DML) present in the gathered query statement(s). More specifically, the data relation output unit analyzes the DML issued by an application, such as relations between data elements used in a transaction, relations between data elements referred to in a single SQL statement, and relations between data elements referred to in a single session. An example of relations between data elements used in a transaction includes an UPDATE command. Similarly, an example of relations between data elements referred to in a single SQL statement include SELECT, UPDATE and DELETE commands. In addition to analyzing the data manipulation language in the gathered query statement, the data relation output unit clarifies characteristics of relations on the basis of the structure of the DML and content of each SQL statement, classifies the characteristics, and displays them for informational purpose. In one embodiment, the analyzed information is displayed in a graphical format. Following the completion of the database analysis, the SQL execution unit executes the SQL statement(s) for the transaction (228), the compiler analyzes the end of the transaction (230), and the status management unit detects completion of the transaction (232). In one embodiment, the end of the transaction is determined by an END transaction statement.

Figure 3:
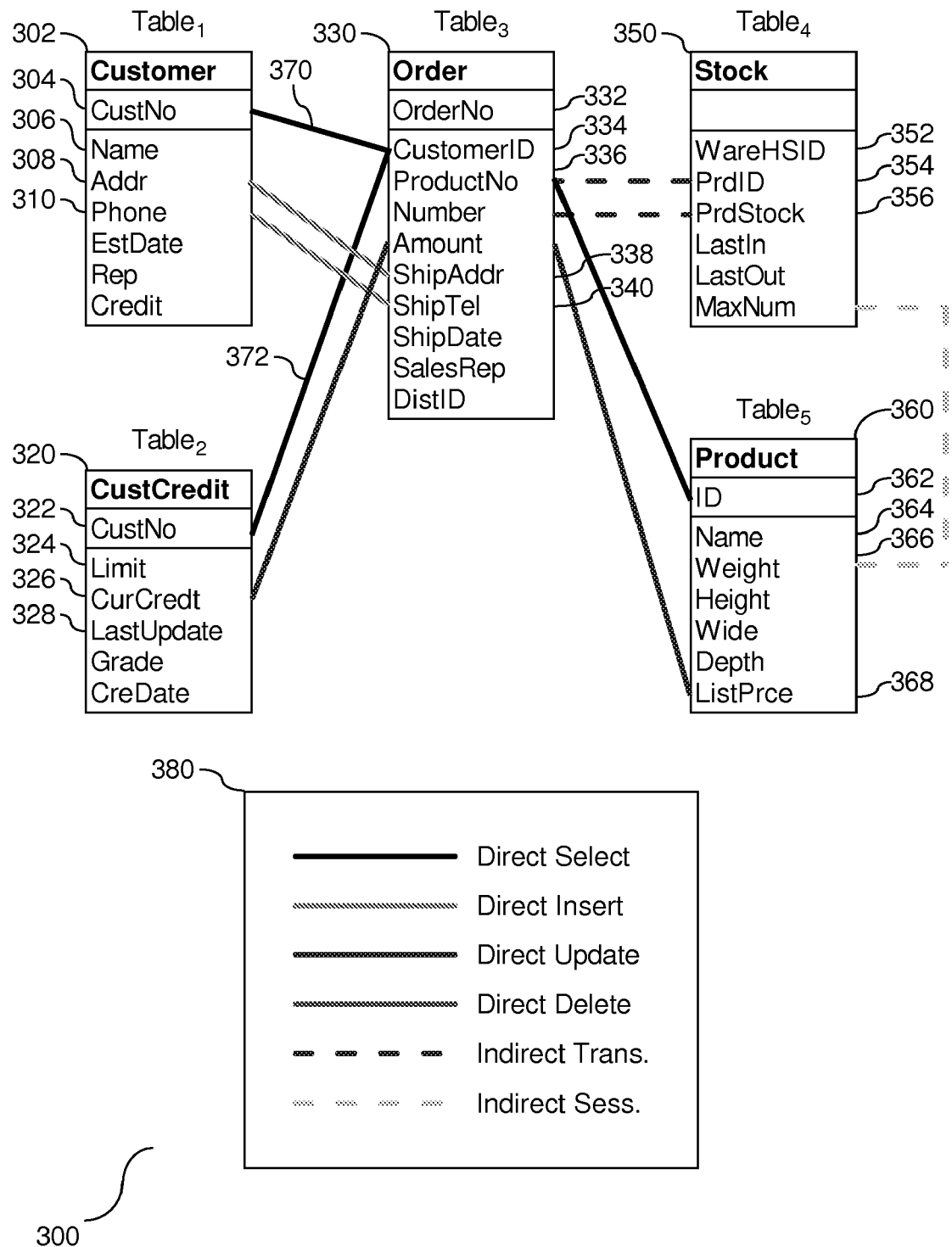
FIG. 3 is a block diagram illustrating display of relationships among tables in a federated database.

FIG. 3 is a block diagram (300) of an example of a graphical display of analyzed database information. As shown, there are five database tables, $Table_1$ (302), $Table_2$ (320), $Table_3$ (330), $Table_4$ (350), and $Table_5$ (360). $Table_1$ (302) represents customer identification information, including, but not limited to, customer number (304), name (306), address (308), telephone number (310) etc. $Table_2$ (320) represents customer credit information, including but not limited to, a customer number (322), credit limit (324), current credit (326), last update (328), etc. $Table_3$ (330) represents order information, including an order number (332), customer number (334), product number (336), shipping address (338), shipping telephone number (340), etc. $Table_4$ (350) represents stock and location of items available for shipment, including but not limited to, ware house identifier (352), product identifier (354), product stock (356), etc. $Table_5$ (360) represents product information, including but not limited to, a product identifier (362), product name (364), product weight (366), list price (368), etc. The relationships between data elements are shown with lines connecting data. For example, as shown, line (370) connects the customer number (304) of $Table_1$ (302) with the customer number (334) of $Table_3$ (330), and line (372) connects the customer number (322) of $Table_2$ (320) with the customer number (334) of $Table_3$ (330). In one embodiment, the lines may be presents in different colors, different thicknesses, and different forms, with these characteristics representing different aspects of the relationships among the table elements. For example, a solid line may be used to represents a direct relationship among the elements, with different colors representing select, insert, update, and delete. Similarly, a non-solid line may be used to indicate relationship among the elements, with different colors representing transactions and sessions. In one embodiment, a legend (380) is provided to translate the graphical characteristics of the lines in graphical display used to show the relationship of data elements.

The invention can take the form of a hardware embodiment, a software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

For the purposes of this description, a computer-useable or computer-readable medium can be any apparatus that can contain, store, communicate, propagate, or transport the program for use by or in connection with the instruction execution system, apparatus, or device.

Advantages Over the Prior Art

Management of the federated database supports dynamically finding relationships between information elements across diverse data sources, i.e. a federated database. Data manipulation language issued by an application is analyzed in view of an application. This analysis supports determining data relationships in real-time and not through statically defined information. For example, tables used in a series of SQL statements are related to each other by analyzing an input SQL statement in a process of compiling the SQL statements.

Alternative Embodiments

It will be appreciated that, although specific embodiments of the invention have been described herein for purposes of illustration, various modifications may be made without departing from the spirit and scope of the invention. In particular, in addition to establishing a relationship among statements in a transaction, the relations among data elements in the same client session can be obtained by subjecting a sub query to a similar relationship established on the basis of the table name(s) and column name(s) used in the SQL statement. In addition, the disclosure should not be limited to relating tables in a database through one or more SQL statements. Alternative languages may be used to navigate a relational or object oriented database while preserving the ability to dynamically relate the tables requested in the query. Accordingly, the scope of protection of this invention is limited only by the following claims and their equivalents.

I claim:

1. A method for relating tables in a database comprising:
a federated server receiving queries within a transaction, said queries provided by gathering data manipulation language for each input statement in a query transaction, wherein said statement refers to elements associated with different databases forming a federated database;

analyzing said data manipulation language in gathered statement, including:
    establishing a relationship between data elements referred to in said statement that are associated with the different databases in real-time, and if said query transaction includes a sub query, executing said sub query, and
    establishing a relationship between data elements in multiple input statements in one client session by extracting table name and column name data used in said transaction associated with said input statement;
    clarifying characteristics of relationships of said data elements based on structure of said data manipulation language and content of said query transaction; and
    classifying said characteristics; and conveying said classified characteristics in a display format.

2. The method of claim 1, wherein the step of establishing a relationship between data elements occurs in real-time during execution of said input statement.

3. The method of claim 1, wherein the step of establishing a relationship between data elements in multiple input statements occurs in an asynchronous manner by using a transaction log.

4. The method of claim 3, wherein the step of establishing a relationship among data elements in one client session includes executing a sub query on a basis of a table name and column name in each input statement.

5. The method of claim 1, wherein the step of conveying said classified characteristics in a display format includes graphically displaying said established relationship through a display apparatus, wherein said display includes said extracted table name and column name and indicia demonstrating said relationship.

6. The method of claim 1, wherein said federated database integrates multiple autonomous database systems into a single database.

7. A computer system comprising:
    a server, having a processor, in communication with a federated database in storage media, said server comprising:
        a status management unit to detect start and end of a query transaction;
        a data processing unit to extract data manipulation language in each query statement within said transaction and to analyze said language, said data manipulation language referring to tables and columns, wherein said tables and columns are associated with different databases forming the federated database and said language analysis includes establishing a relationship between data elements in multiple input statements in one client session;
    a data relation output unit to establish a relationship among extracted tables and columns in real-time, and if said query transaction includes a sub query, executing said sub query; and
    said data relation output unit to clarify characteristics of said established relationship based on structure of said data manipulation language and content of said query transaction, and classify said characteristics, and to convey said classified characteristics in a visual display.

8. The computer system of claim 7, wherein said data relation output unit establishes a relationship between data elements in real-time.

9. The computer system of claim 7, wherein said data relation output unit establishes a relationship between data elements in multiple input statements asynchronously through use of a transaction log.

10. The computer system of claim 7, wherein said data relation out unit establishes a relationship among data in one client session.

11. The computer system of claim 7, further comprising execution of a sub query on a basis of a table name and column name in each input statement.

12. The computer system of claim 7, wherein said visual display includes extracted table name, extracted column name, and indicia to demonstrate said relationship.

13. An article comprising:
    a computer readable data storage medium;
    instructions in said medium to receive queries within a transaction, said queries provided by gathering data manipulation language for each input statement in a query transaction, wherein said statement refers to data elements associated with different databases forming a federated database;
    instructions in said medium to analyze said data manipulation language in said gathered statement, including:
    establishing a relationship between the data elements referred to in said statement that are associated with different databases in real-time, and if said query transaction includes a sub query, executing said sub query, and
    establishing a relationship between the data elements in multiple input
    statements in one client session by extracting table name and column name data used in said transaction associated with said input statement;
    instructions in said medium to clarify characteristics of relationships of said data elements based on structure of said data manipulation language and content of said query transaction;
    instructions in said medium to classify said characteristics; and instructions in said medium to convey said classified characteristics in a display format.

14. The article of claim 13, wherein said instructions to establish a relationship between data elements includes instructions to extract table and column name data.

15. The article of claim 13, wherein said instructions to establish a relationship between data elements occurs in an asynchronous manner through a log of said query transaction.

16. The article of claim 14, further comprising instructions to execute a sub query based on said table and column name in each input statement.

17. The article of claim 13, wherein said instructions to establish a relationship between data elements occurs in real-time during execution of said input statement.

18. The article of claim 13, further comprising instruction to graphically display said established relationship between data elements through a visual display, wherein said visual display includes extracted table and column name and indicia demonstrating said relationship.

* * * * *